(12) United States Patent
Falck et al.

(10) Patent No.: US 9,908,592 B2
(45) Date of Patent: *Mar. 6, 2018

(54) RIDE-HEIGHT ADJUSTABLE AIR SHOCK BOAT SEAT PEDESTAL WITH LOCKING SWIVEL

(71) Applicant: Lee Falck, Forest Lake, MN (US)

(72) Inventors: Lee Falck, Forest Lake, MN (US); Kyle Ridlon, Wright, MN (US)

(73) Assignee: Lee Falck, Forest Lake, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,888

(22) Filed: Feb. 8, 2017

(65) Prior Publication Data

US 2017/0144734 A1 May 25, 2017

Related U.S. Application Data

(63) Continuation of application No. 15/080,023, filed on Mar. 24, 2016, now Pat. No. 9,604,707.

(60) Provisional application No. 62/137,352, filed on Mar. 24, 2015.

(51) Int. Cl.
| | |
|---|---|
| B63B 17/00 | (2006.01) |
| B63B 29/04 | (2006.01) |
| B60N 2/52 | (2006.01) |
| B60N 2/14 | (2006.01) |

(52) U.S. Cl.
CPC .............. *B63B 29/04* (2013.01); *B60N 2/146* (2013.01); *B60N 2/525* (2013.01); *B60N 2/527* (2013.01); *B63B 2029/043* (2013.01)

(58) Field of Classification Search
CPC ............ B63B 29/04; B60N 2/05; B60N 2/527
See application file for complete search history.

(56) References Cited

U.S. PATENT DOCUMENTS

| | | | |
|---|---|---|---|
| 4,379,540 A * | 4/1983 | French .................... | A47C 3/18 248/406.2 |
| 5,465,679 A | 11/1995 | Mardikian | |
| 5,746,152 A | 5/1998 | Huse | |
| 5,911,191 A | 6/1999 | Burer | |
| 6,182,590 B1 | 2/2001 | Patera | |
| 6,880,483 B2 | 4/2005 | Fedders | |
| 7,549,387 B2 | 6/2009 | Funk | |
| 7,703,585 B2 | 4/2010 | Fox | |
| 8,511,655 B2 | 8/2013 | Wu | |
| 9,604,707 B2 * | 3/2017 | Falck ..................... | B60N 2/146 |
| 2005/0179288 A1 | 8/2005 | Lizaso et al. | |
| 2013/0118847 A1 | 5/2013 | Krahenbuhl et al. | |

* cited by examiner

*Primary Examiner* — Stephen P Avila
(74) *Attorney, Agent, or Firm* — Simmons Perrine Moyer Bergman PLC

(57) ABSTRACT

A ride height adjustable oil damped air shock boat seat pedestal with selectively lockable swivel capability is shown, which includes a locking pin extending below the seat and moving up and down with the seat as permitted and controlled by the air shock. The locking pin being received by a structure, which limits rotation of the seat.

20 Claims, 16 Drawing Sheets

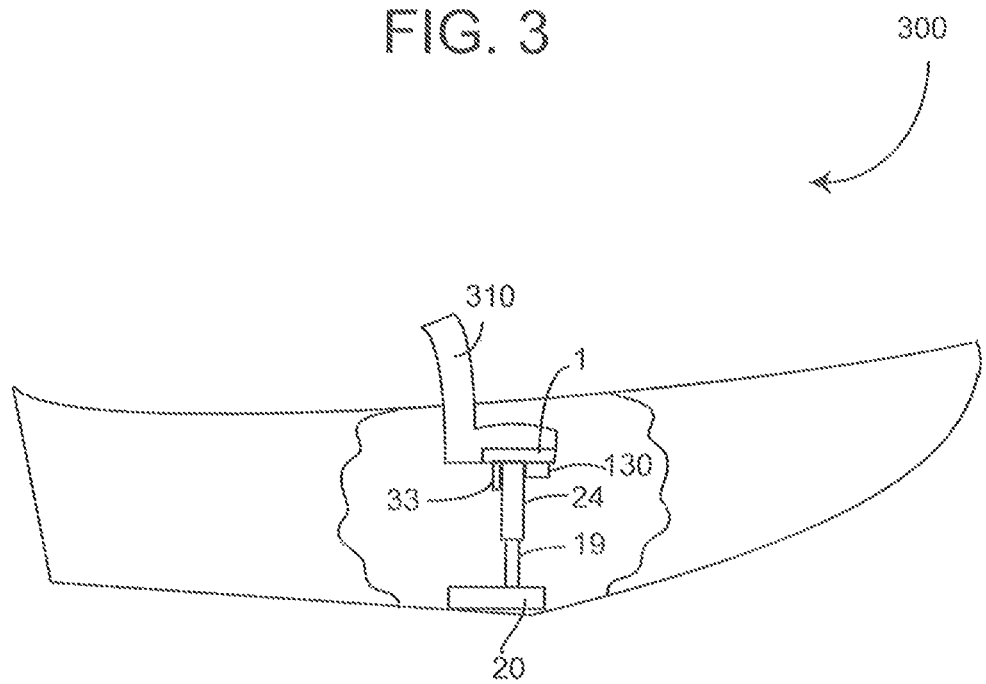

SECTION A-A

SECTION B-B

RIDE-HEIGHT ADJUSTABLE AIR SHOCK BOAT SEAT PEDESTAL WITH LOCKING SWIVEL

CROSS REFERENCE TO RELATED APPLICATIONS

This application is a continuation of the non-provisional patent application with the same title and filed by the same inventors on Mar. 24, 2016, and having application Ser. No. 15/080,023, and claims the benefit of the filing date of the provisional patent application with the same title and filed by the same inventors on Mar. 24, 2015, and having Ser. No. 62/137,352, which applications are incorporated herein by reference in their entirety.

FIELD OF THE INVENTION

The present invention relates to improved systems and methods for supporting a boat seat.

BACKGROUND OF THE INVENTION

The present invention relates generally to a ride-height and/or passenger weight adjustable shock absorbing boat seat pedestal, and methods of constructing and utilizing same.

More particularly, the present invention relates to a shock absorbing boat seat pedestal which uses an air filled portion, and liquid and gaseous matter combination filled portion, and methods of constructing and utilizing same.

The prior art includes at least the following U.S. patents:

U.S. Pat. No. 5,465,679 issued on Nov. 14, 1995 to Albert Mardikian entitled "PERSONAL WATERCRAFT AND BOAT WITH SHOCK ABSORBING FLOORBOARDS;"

U.S. Pat. No. 6,182,590 issued on Feb. 6, 2001 to John M. Patera entitled "PERSONAL WATERCRAFT SUSPENSION SYSTEM;"

U.S. Pat. No. 6,880,483 issued on Apr. 19, 2005 to Brandon J. Fedders entitled "ACTIVE SEAT SUSPENSION FOR WATERCRAFT;"

U.S. Pat. No. 7,549,387 B2 issued on Jun. 23, 2009 to James Joseph Funk entitled "SHOCK ABSORBING SEAT PEDESTAL;"

U.S. Pat. No. 7,703,585 B2 issued on Apr. 27, 2010 to Robert C. Fox entitled "INTEGRATED AND SELF-CONTAINED SUSPENSION ASSEMBLY HAVING AN ON-THE-FLY ADJUSTABLE AIR SPRING;"

U.S. Pat. No. 5,911,191 issued on Jun. 15, 1999 to Peter J. Surer entitled "SHOCK ABSORBING SEAT PEDESTAL;" and U.S. Pat. No. 8,511,655 B2 issued on Aug. 20, 2013 to Yan-Ting Wu entitled "BICYCLE SEAT POST."

While these prior art methods have been known in the past and may have provided some utility to persons sitting in boat seats, they do have several problems, some of which are overcome by the present invention. One challenge not fully addressed by the prior art is the fact that, as the boat's speed across the water increases, both the frequency of impacts with waves increases as well as the magnitude of the force on the seat pedestal (or pilot's vertebrae) from each individual wave impact increases. This increases the need for a highly durable shock and for a durable swivel lock.

SUMMARY OF THE INVENTION

It is an object of the present invention to provide a comfortable ride to persons sitting in a boat seat.

It is a feature of the present invention to include a ride-height adjustable pneumatic boat seat pedestal with a locking swivel.

It is an advantage of the present invention to provide for simultaneous and independent ride-height adjustment and rebound speed-damping adjustment of a selectively swivelable boat seat.

The present invention is designed to achieve the above-mentioned objectives, include the previously stated features, and provide the aforementioned advantages.

An embodiment of the present invention comprises a selectively lockable swivel seating system for supporting a person in an elevated position above a lower portion of a boat, where the seating system comprises:

a boat seat having a bottom portion;

a boat seat base portion configured to couple with said bottom portion of said boat seat;

a base member portion configured to couple with a portion of a boat, which is generally lower than a boat seat height;

a non-fixed length pedestal disposed between said boat seat base portion and said base member portion, said non-fixed length pedestal comprising:

a first tube;

a second tube; said second tube at least partially nested within said first tube; said second tube being sized and configured to permit rotation of said second tube inside said first tube;

an air chamber disposed within one of said first tube and said second tube;

a liquid chamber disposed within another of said first tube and said second tube; said liquid chamber being variably disposed within said one of said first tube and said second tube;

a piston disposed within said liquid chamber and coupled to a portion of said one of said first tube and said second tube;

means for introducing pressurized air into said air chamber where an increase in air pressure in said air chamber results in an adjustment of support provided for said boat seat;

means for adjustably restricting a liquid flow rate from one side of said piston to another side of said piston and thereby adjustably limiting a rebound rate of said piston after a temporary force applied to said boat seat pedestal is reduced; and a selective swivel locking mechanism, which comprises:

a lock pin; and a lock pin receiver configured to receive therein the lock pin at variable penetration depths.

Another embodiment of the present invention comprises a system for supporting a seated person in a boat comprising:

a support structure, configured to support a seated person;

a floor plate mount configured to be rigidly fixed to floor in a boat;

a first tube, having a first tube central longitudinal axis;

a second tube, having a second tube central longitudinal axis which is co-linear with respect to said first tube central longitudinal axis;

said first tube and said second tube being arranged with respect to each other in a nested arrangement where relative translational movement therebetween is possible along said first tube longitudinal axis and said second tube longitudinal axis; and said nested arrangement extending along said first tube central longitudinal axis between said support structure and said floor plane mount;

said first tube and said second tube forming a portion of an oil-damped shock having a shock central longitudinal axis which is co-linear with said first tube central longitudinal axis;

one of said first tube and said second tube being configured to allow rotation around said shock central longitudinal axis; and a rotational lock system comprising:
  a lock pin having a lock pin central longitudinal axis;
  a lock pin receiver having a lock pin receiver central longitudinal axis which is co-linear with respect to said lock pin central longitudinal axis;
  a release pin configured to release one of said lock pin and said lock pin receiver from a coupled relationship with respect to said support structure when said release pin is removed from a release pin receiving orifice; and
  said lock pin and said lock pin receiver being configured to prohibit rotation of said support structure about said shock central longitudinal axis when said release pin is disposed in said release pin receiving orifice.

Other objectives, advantages and features of the invention will become apparent to those persons skilled in this particular area of technology, and to other persons, after having been exposed to the following detailed description, when read in conjunction with the accompanying patent drawings.

BRIEF DESCRIPTION OF THE DRAWINGS

FIG. 3 is a cut-away elevation view of a boat of the present invention, exposing a variant of the pedestal of FIG. 1 and FIG. 2.

DETAILED DESCRIPTION OF THE INVENTION

Figure 1:
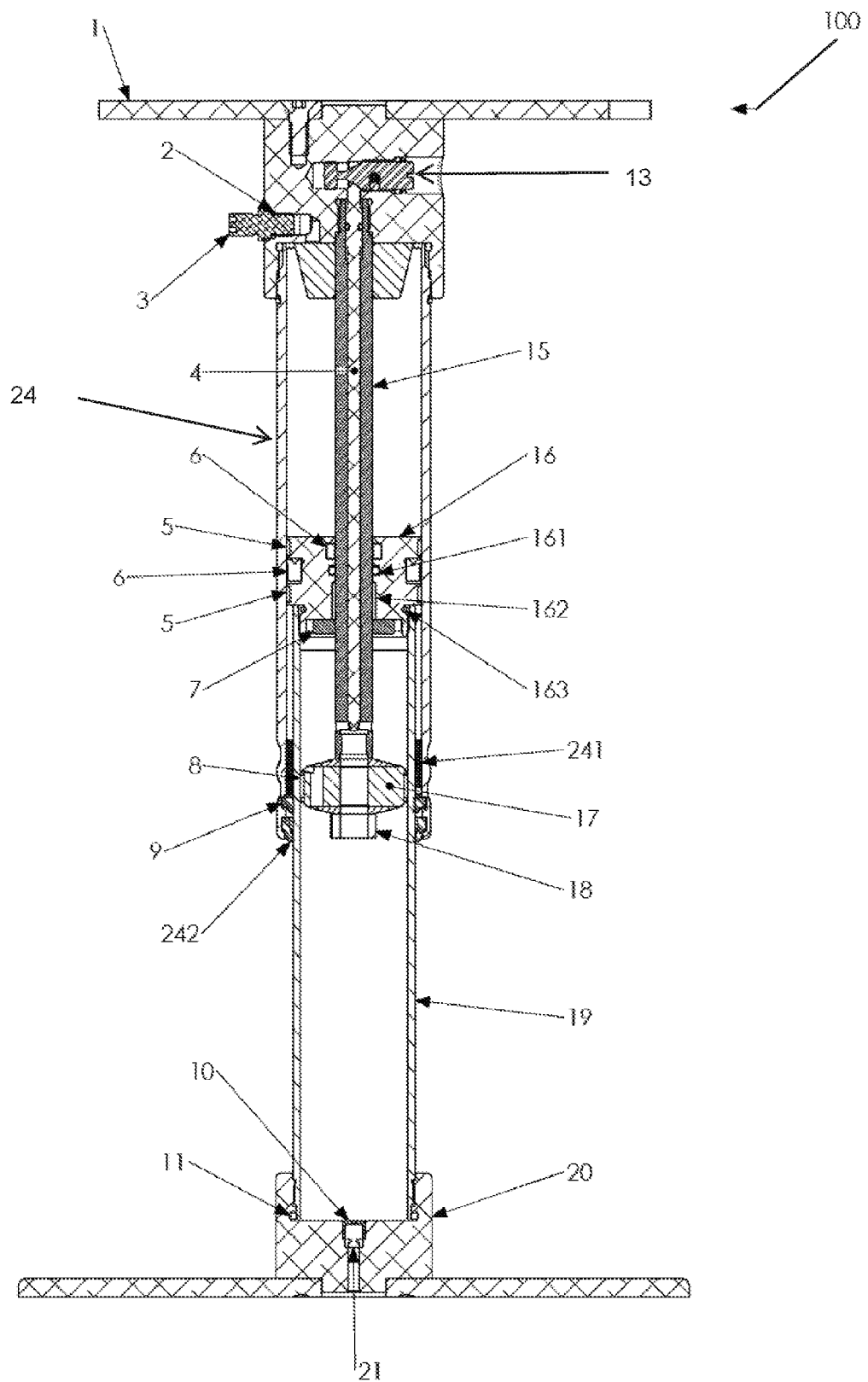
FIG. 1 is a cross-sectional view of a shock absorber boat seat pedestal in accordance with the invention.

Now referring to the drawings wherein like numerals refer to like structure shown in the drawings and text included in the application throughout. With reference to FIG. 1, there is shown a boat seat pedestal of the present invention generally designated 100 which includes a seat base, or boat seat mating plate 1, a Schrader valve 3 with an adjacent O-ring 2. Schrader valve 3 is provided as an input location for air into the air compartment of the upper tube 24. A high pressure air source 33 (FIG. 3) could be a manual air pump, an electric air pump, a reserve air tank or other source of pressurized air, which could be coupled to the Schrader valve 3, or it could replace the Schrader valve 3 in some applications. Inside of upper tube 24, running from an upper location to a lower location, is a hollow shaft 15 with a rebound-metering rod 4 disposed therein. In some embodiments, the hollow shaft 15 could be replaced with a solid shaft, and rebound adjustment would be omitted from involvement with the shaft coupled to the piston 17.

A lower tube or body 19 is disposed near a base, or floor plate mount 20, which is attached to the boat 300 of FIG. 3. Disposed within body 19 is a piston 17, which is coupled to and moves up and down with shaft 15. Metering rod 4 forms, or controls, a portion of a valve which regulates the rate at which fluid can flow from one side of the piston to another side. This regulation of flow rate is a rebound adjustment, which is adjusted by rebound adjuster 13, which manipulates a top portion of the rebound-metering rod 4. Additionally, variable sized holes may be located through the piston so that flow rate corresponds to hole size. Hole size may be changed by inserting sleeves, shims, partial plugs, etc. Placed atop the body 19 and inside the upper tube 24 is bearing assembly 16, which is affixed to the body 19 and separates the upper (inside upper tube 24) and lower (inside body 19) fluid chambers. Bearing assembly allows the upper tube to pass by and allows the shaft 15 to pass therethrough. Bearings 5 and 162, seal 6 and O-rings 161 and 163 are shown. A bumper 7 is also shown which performs the function of preventing metal on metal collisions.

Piston 17 has a piston bearing 8 and a nut 18. At the lower end of the upper tube 24, there is a bearing 241, a wiper seal 9 and an end seal 242.

The body 19 is designed to retain oil and nitrogen, and an O-ring 11 is shown as a seal, also there is a retainer 10, which holds a rubber pill 21, through which nitrogen can be added when necessary.

Figure 2:
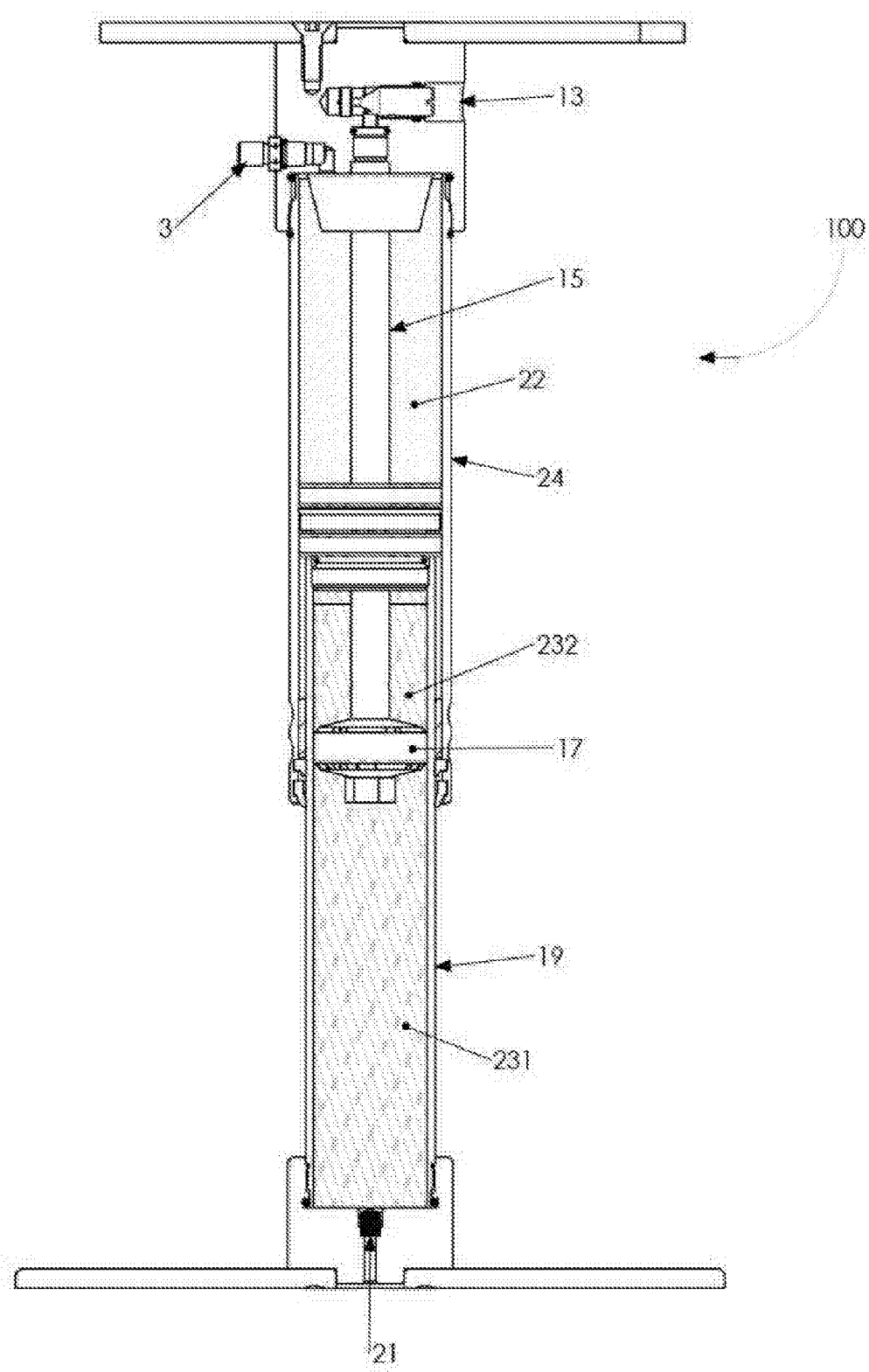
FIG. 2 is a cross-sectional view of a first embodiment of the invention including the optional external reservoir.

Now referring to FIG. 2, there is shown the pedestal 100 of FIG. 1 with oil and nitrogen in the oil chamber 23, body 19 and air in the air chamber 22 in upper tube 24. The oil chamber 23 may be filled with just oil and a reservoir can be provided to allow oil to escape as more of the shaft 15 moves downward into the body 19. The oil chamber is divided into upper variably sized oil chamber 232 and a lower variably sized oil chamber 231. As the piston goes down, such as in response to a person sitting down on the seat or the boat hitting a wave, the volume in upper variably sized oil chamber 232 is increasing and therefore has decreasing pressure, therefore the oil passes through the holes in piston 17 and/or through the valve opening variably created by the bottom end of metering rod 4 (FIG. 1). If the jolt from the wave is particularly large, the speed at which the piston travels downward will be limited by how quickly the oil can pass through the holes in the piston and the valve. Similarly, the maximum rate of flow of oil will restrict the speed at which the piston 17, and therefore the seat base 1 and boat seat, rebound to being fully extended. The adjustment of rebound adjuster 13 therefore sets the amount of damping of the air shock which is formed by air chamber 22.

Now referring to FIG. 3, there is shown a boat 300 with a variation of the pedestal 100, which has an air pressure input source 33 at the site of the Schrader valve 3 of FIGS. 1 and 2, and a rebound-adjusting nob 130 at the site of the rebound adjuster 13. A seat 310 is disposed atop the upper tube 24.

Now referring to FIGS. 1 through 3, and in operation, the air pressure within air chamber 22 is increased and thereby the ride height is increased for a given passenger or the ride height is maintained for a heavier passenger, and when a person sits on the seat, the seat base goes down, the other tube 24 passes over more of the inner tube 19, the size of the air chamber 22, which is defined by the space inside the outer tube 24, which is above the bearing assembly 16, decreases. The lower variably sized oil chamber is caused to decrease in volume proportional with a decrease in the air chamber volume.

Figure 5:
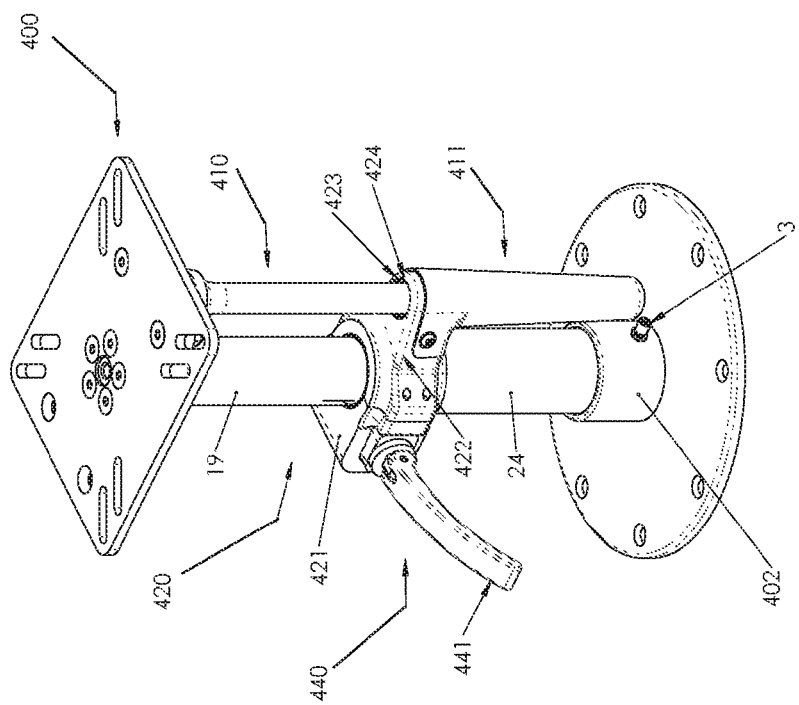
FIG. 5 is a second perspective view of the swivel locking seat embodiment of FIG. 4.
Figure 4:
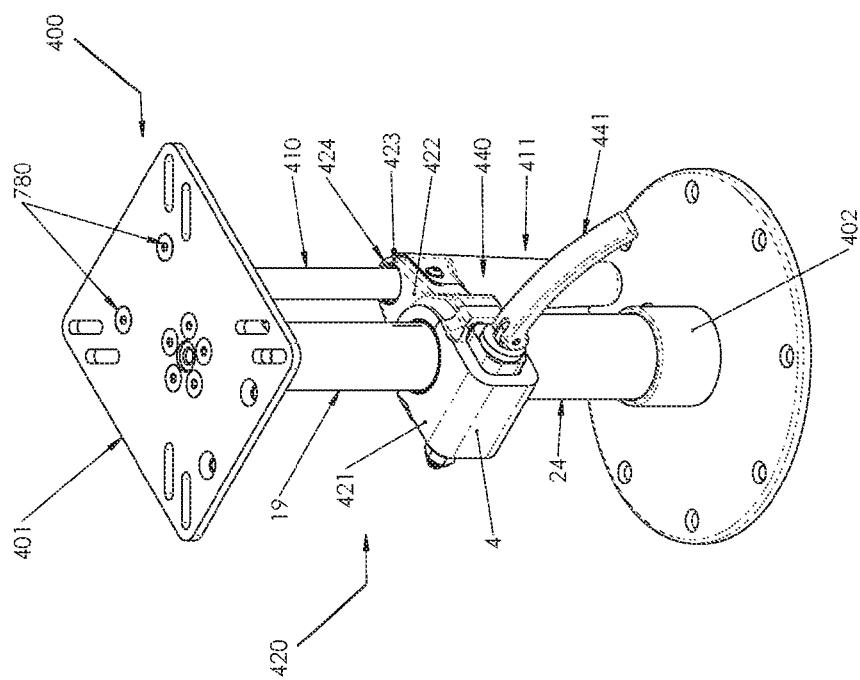
FIG. 4 is a first perspective view of a swivel locking seat embodiment of the present invention.

Now referring to FIGS. 4 and 5, there is shown a selectively lockable swivel boat seat pedestal of the present invention, generally designated 400, which includes a boat seat mating plate 401, which is configured to mate with a portion of a seat (not shown), and a boat floor mating plate 402, which is configured to mate with structure on a boat floor. The boat seat mating plate 401 and boat floor mating plate 402 are coupled to each other by an assembly such as is described and shown in FIGS. 1-3. It should be noted that the embodiment of FIG. 4 may be nearly identical to that of FIGS. 1-3 except that the shock has been inverted so that tube 19 is disposed above tube 24. There may be some advantages relating to oil containment as well as other factors. It is believed that a person skilled in the art who understands the system described in FIGS. 1-3 could readily understand how to invert the assembly of FIGS. 1-3 and have tube 19 above tube 24. This embodiment of the present invention includes additional structure to permit simultaneous shock absorption and swiveling of the seat while it is attached to a boat and further permit selectively locking the swivel capability, while the vessel is under way, so as to better correspond to standards of the American Boat and Yacht Council, of Annapolis, Md., which develops consensus safety standards for small craft.

A lock pin assembly 410 is coupled to boat seat mating plate 401 by a pair of lock pin retaining bolts 780. An elongated portion of lock pin assembly 410 extends downward from boat seat mating plate 401 and is used to selectively restrict swiveling of the boat seat mating plate 401. The elongated portion of lock pin assembly 410 could be a distinct piece from the portion which is bolted to boat seat mating plate 401 and, in some embodiments, it may be configured to rotate in a way that could benefit in reduction of binding forces during certain scenarios of operation. Lock pin assembly 410 can be aluminum, steel, brass or other suitable material.

Bearing head assembly 420 can be aluminum, steel, brass or other suitable material and is shown disposed around and at a top portion of tube 24. Tube 24 is configured to retain a bearing therein to facilitate the rotation of tube 19 within tube 24. Bearing head assembly 420 comprises a bearing headlock lever portion 421 and mating therewith and bolted thereto a bearing headlock pin engaging portion 422. Both bearing headlock lever portion 421 and bearing headlock pin engaging portion 422 have internal surface relief features thereon and therein which are configured to mate with surface relief features of the exterior of the bearing retaining portion at the top of tube 24. See FIGS. 10 and 11 for additional details regarding such surface features.

Locking lever assembly 440 can be aluminum, steel, brass or other suitable material and is shown disposed only partially within bearing head-lock lever portion 421. Locking lever assembly 440 could include a handle 441 and a threaded connector 442. Bearing head assembly 420 is designed to selectively couple to the surface features of tube 24 so as to eliminate relative movement between bearing head assembly 420 and tube 24 when locking lever assembly 440 is in a locked configuration. Bearing head-lock pin engaging portion 422 is shown with a bearing head-lock pin engaging portion closed end portion 424 which could be omitted so long as enough of bearing head-lock pin engaging portion 422 is disposed about lock pin assembly 410 that rotation of lock pin assembly 410 about tube 24 is not possible when the locking lever assembly 440 is in a locked configuration. Also shown is pin guard 411, which can be aluminum, plastic or other suitable material and is a safety shroud to protect clothing, items, or body parts from being damaged if pinched between the bottom of lock pin assembly 410 and boat floor mating plate 402 or other structure. The minimum length of pin guard 411 is determined by the maximum travel of the boat seat pedestal when absorbing shock. Also, the bottom of pin guard 411 is configured to be above any potentially interfering structures, such as valve 3.

During times when the boat operating is not underway, the locking lever assembly 440 can be in an unlocked configuration and when the boat seat mating plate 401 is rotated (along with the attached seat—not shown) the bearing head assembly 420 is free to rotate about tube 24, thereby enabling swiveling of the seat. However, when the pilot or passenger desires to have the seat fixed (without the ability to rotate), the locking lever assembly 440 is locked and the bearing head assembly 420 becomes coupled to the tube 24. However, an important distinction between the present invention and certain prior art devices is that the shock absorbing capability of the invention is not eliminated because tube 19 is free to translate in and out of tube 24. Another key aspect of the present invention is that when the locking lever assembly 440 is locked, it does not cause a deformation of the shape of tube 24 so much as to prevent rotation of or translation of the tube 19 within tube 24 by substantially increasing contact between tube 19 and tube 24. Such deformation is also undesirable for oil retention purposes.

Figure 6:
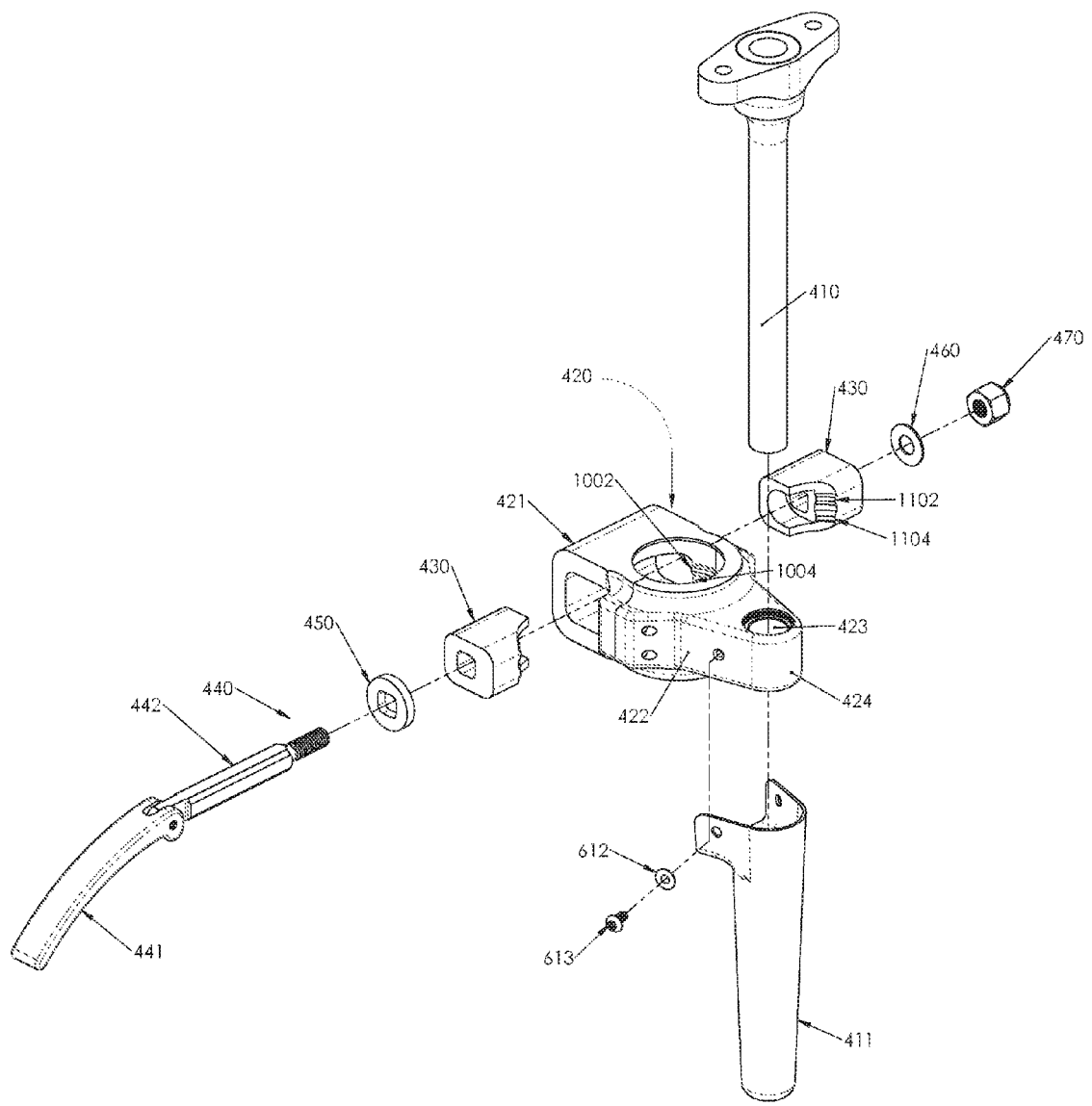
FIG. 6 is an exploded perspective view of the swivel lock assembly of FIG. 4.

Now referring to FIG. 6, there is shown an exploded view of the portions of the present invention, which selectively prohibits rotations of tube 19 in tube 24. Bearing assembly 420 is selectively coupled to tube 24 via manipulation of locking lever assembly 440, which includes wear washer 450 and brake shoe 430 and another brake shoe 430, lever lock nut flat washer 460 and lever lock nut 470, all of which can be aluminum, steel, brass or other suitable material. Bearing head-lock lever portion 421 and bearing head-lock pin engaging portion 422, when bolted together, generally create a circular void therein to receive a top portion of tube 24. When the handle 441 of locking lever assembly 440 is put in a locked or tightened orientation, then brake shoes 430 are forced to engage the surface features at the top of tube 24 and thereby limit the ability of bearing head assembly 420 to rotate about tube 24. When lock pin assembly 410 is coupled to boat seat mating plate 401 (FIG. 4) and is inserted through lock pin receiving void 423 in bearing head-lock pin engaging portion 422 this causes bearing head assembly 420 to rotate with tube 19. However, when locking lever assembly 440 is locked, then bearing head assembly 420 is coupled to tube 24, which is substantially fixed with respect to the boat floor mating plate 402. As the boat encounters waves, the bottom end of lock pin assembly 410 safely moves up and down within pin guard 411.

Figure 7:
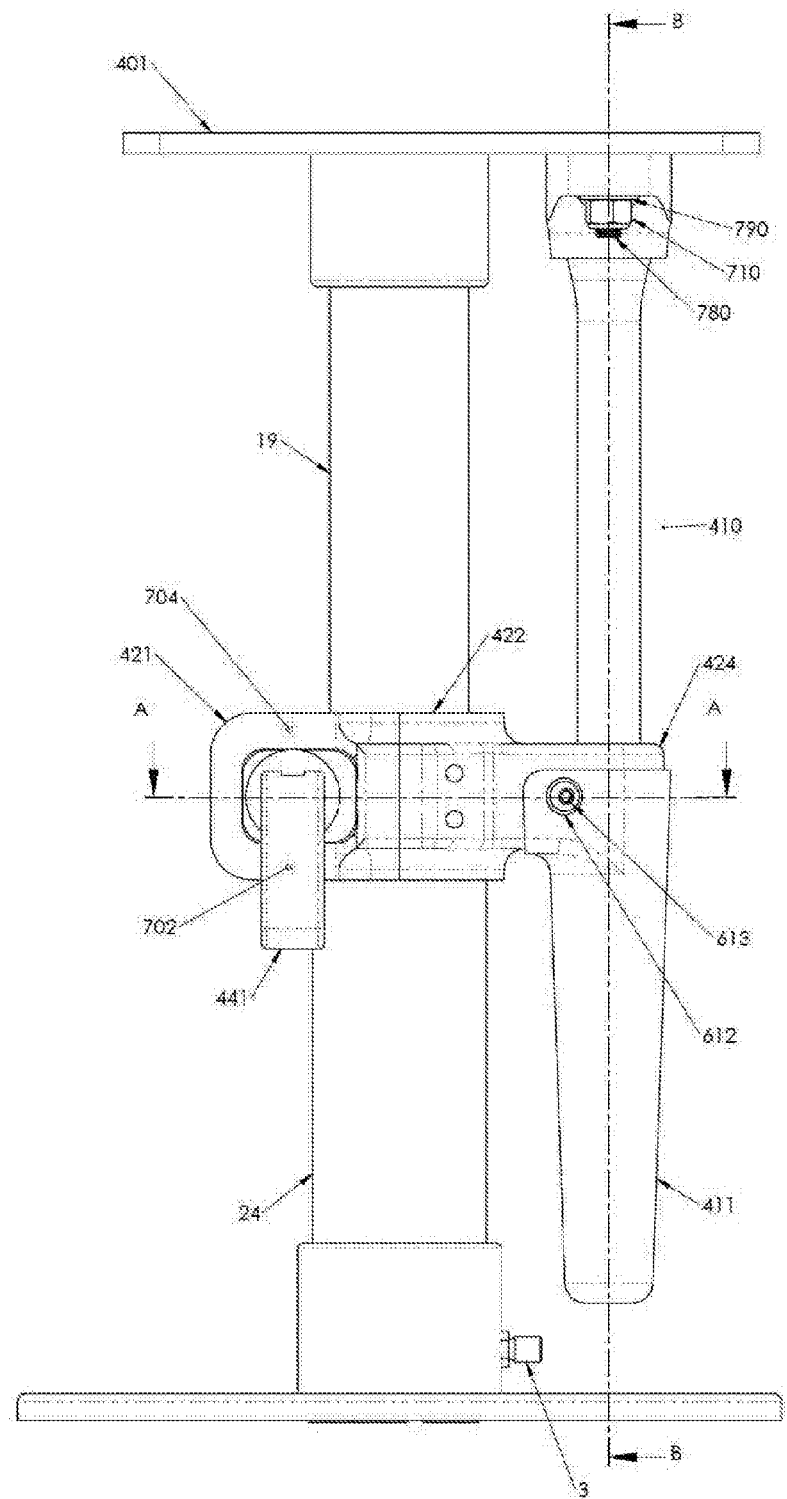
FIG. 7 is an elevation view of the embodiment of FIG. 4, wherein the line from A to A defines the view of FIG. 8 and the line from B to B defines the view of FIG. 9.

Now referring to FIG. 7, there is shown an elevation view of the apparatus of FIG. 4. Lock pin retaining bolt 780 is shown disposed through boat seat mating plate 401 and held in place with the assistance of lock pin retaining washer 790 and lock pin retaining lock nut 710. Also shown is an optional handle retention means which could include a first magnet 702 coupled to the handle 441 and a second magnet coupled to the brake shoe 430, so that when the handle 441 is unlocked and the tubes 19 and 24 are permitted to rotate with respect to each other, then the handle 441 may be held in an orientation which eliminates engagement and entanglement with clothing, etc. Note that optional items 702 and 704 are not shown in any other figure.

Figure 8:
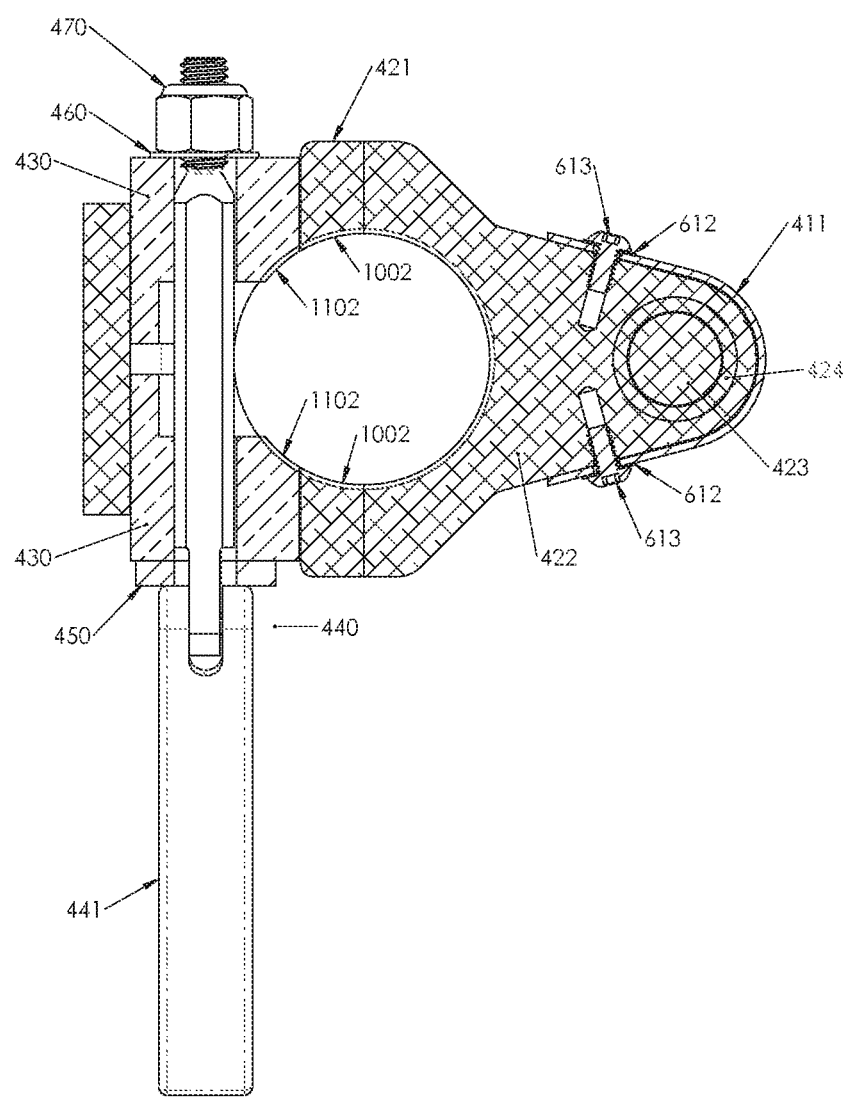
FIG. 8 is a cross-sectional view of the embodiment of FIG. 4 taken on line A-A of FIG. 7.

Now referring to FIG. 8 there is shown a cross-sectional view of an embodiment of the present invention taken on line A-A of FIG. 7. The nearly perfect alignment of top bearing groove mating brake shoe protuberance 1102 and top bearing groove mating protuberance 1002 would suggest that the lever of locking lever assembly 440 is not in a fully locked orientation. When locking lever assembly 440 is fully locked, the top bearing groove mating brake shoe protuberance 1102 would be expected to be slightly protruding into the central void for receiving tube 24. This slight protrusion would be expected to engage the surface features at the top of tube 24 and thereby prohibit rotation of bearing head assembly 420 about tube 24.

Figure 9:
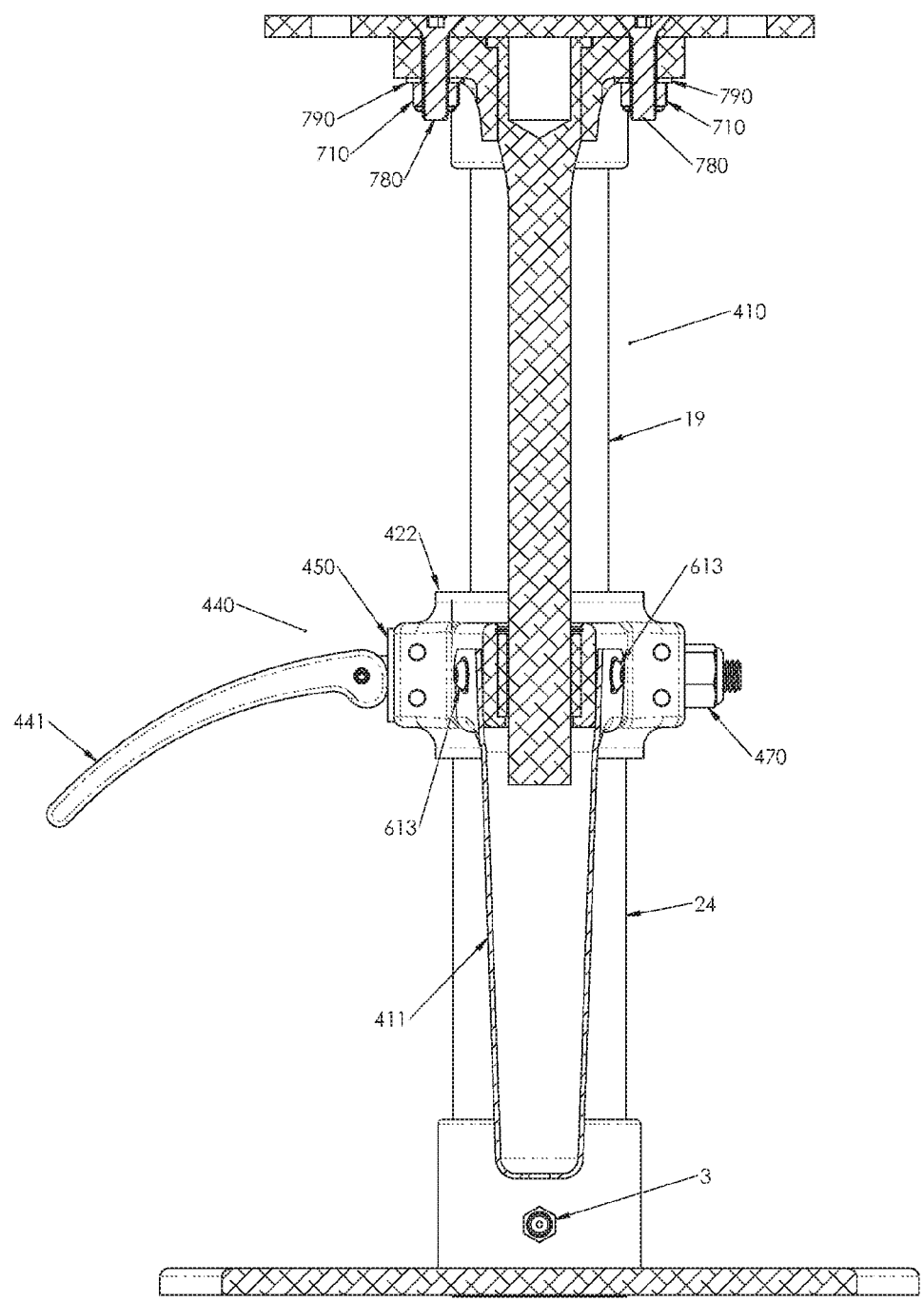
FIG. 9 is a cross-sectional view of the embodiment of FIG. 4 taken on line B-B of FIG. 7.

Now referring to FIG. 9, there is shown a cross-sectional view of an embodiment of the present invention taken on line B-B of FIG. 7. The lever of locking lever assembly 440 is shown in a not fully locked orientation.

Figure 10:
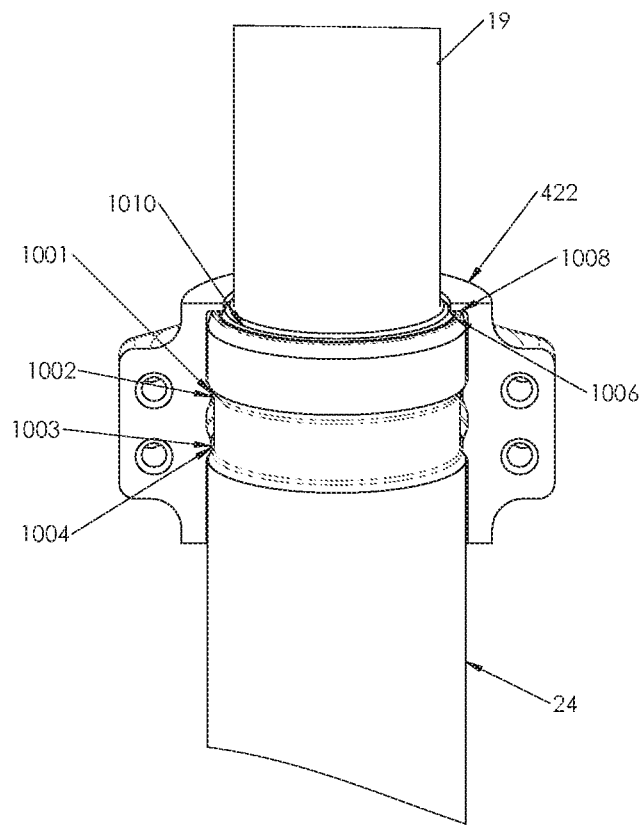
FIG. 10 is a perspective view of partially dismantled portions of the present invention, exposing to view exterior surface features of tube 24.

Now referring to FIG. 10, there are shown partially disassembled portions of the present invention to reveal surface features of the exterior of the top portion of tube 24. The top portion of tube 24 is shown having a pair of spaced apart indentations. These indentations may correspond to protruding rings inside tube 24, which aid in retention of a bearing used to facilitate rotation of tube 19 within tube 24. Bearing head-lock pin engaging portion 422 is shown have top bearing groove mating protuberance 1002 and bottom bearing groove mating protuberance 1004 disposed within top groove 1001 and bottom groove 1003, respectively.

Figure 11:
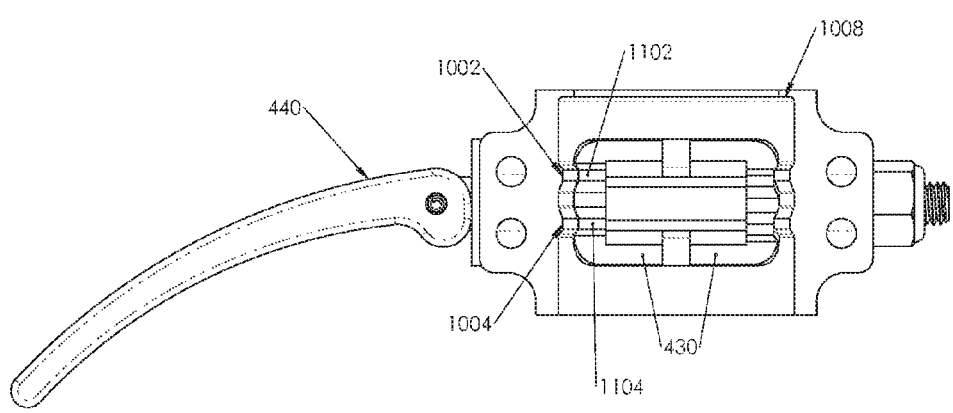
FIG. 11 is a perspective view of a collection of pieces of the present invention arranged to shown a configuration of internal components.

Now referring to FIG. 11, there is shown an assembly of parts of the present invention, which displays an orientation of the locking lever assembly 440 in an unlocked configuration. Top bearing groove mating brake shoe protuberance 1102 is shown recessed from top bearing groove mating protuberance 1002. Similarly, bottom bearing groove mating brake shoe protuberance 1104 is recessed from bottom bearing groove mating protuberance 1004. If the locking lever assembly 440 were fully locked, the top bearing groove mating brake shoe protuberance 1102 and bottom bearing groove mating brake shoe protuberance 1104 would extend inwardly past the adjacent edges of top bearing groove mating protuberance 1002 and bottom bearing groove mating protuberance 1004, respectively.

Figure 14:
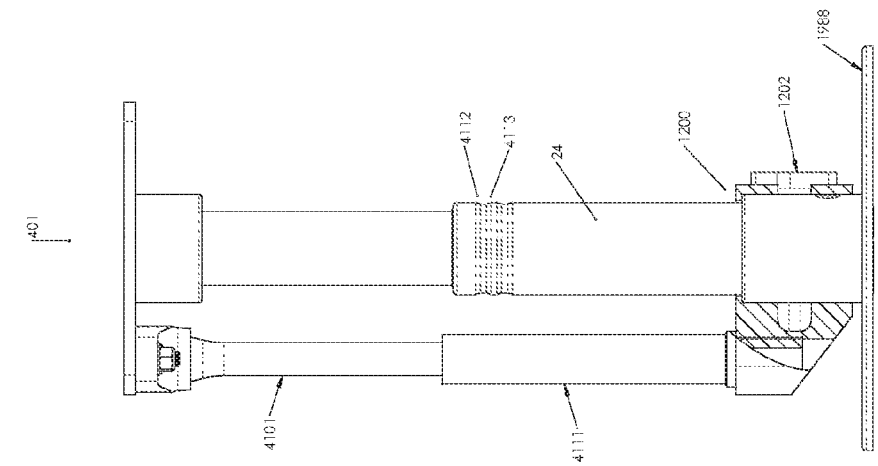
FIG. 14 is a second side elevation view of the embodiment of FIG. 12.
Figure 13:
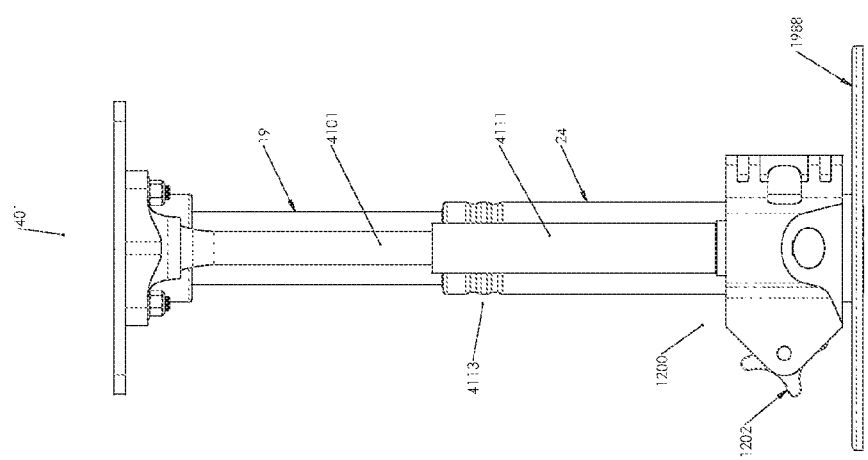
FIG. 13 is a backside elevation view of the embodiment of FIG. 12.
Figure 12:
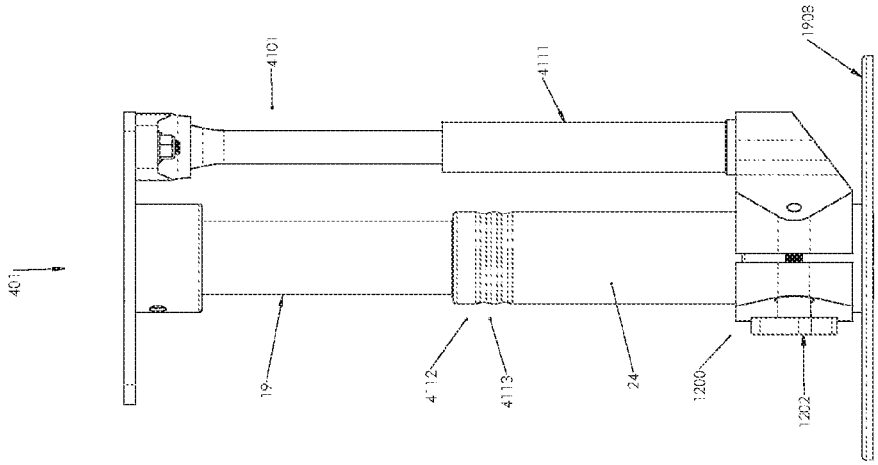
FIG. 12 is a first side elevation view of an alternate embodiment of the present invention.
Figure 15:
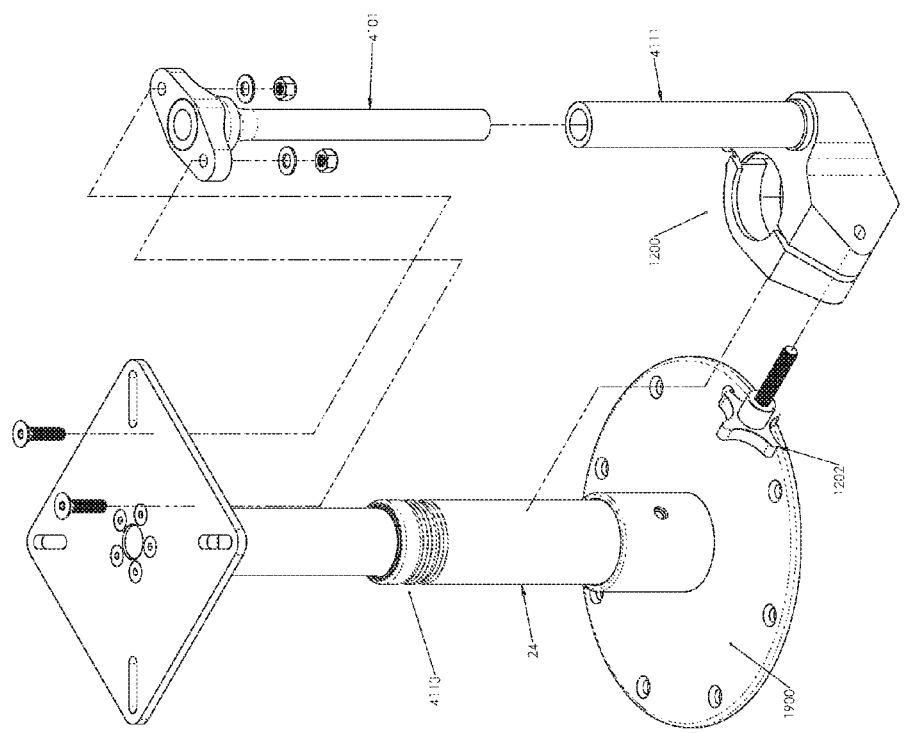
FIG. 15 is an exploded perspective view of the embodiment of FIG. 12.
Figure 18:
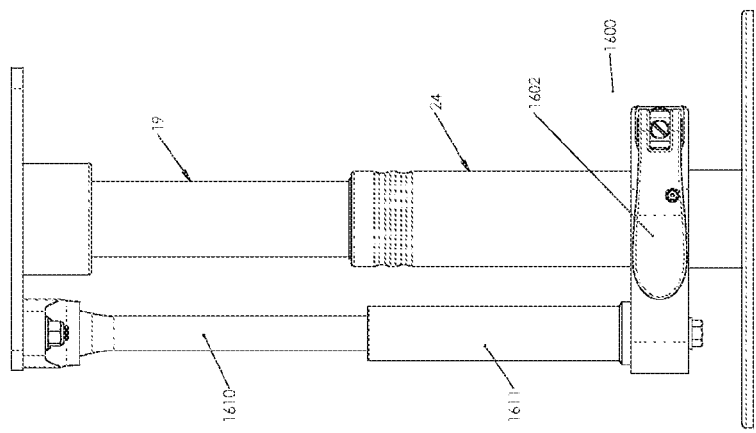
FIG. 18 is a second side elevation view of the embodiment of FIG. 16.
Figure 17:
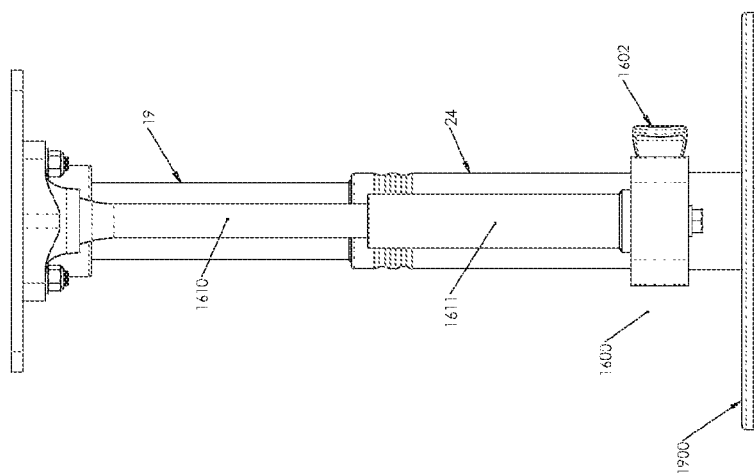
FIG. 17 is a backside elevation view of the embodiment of FIG. 16.
Figure 16:
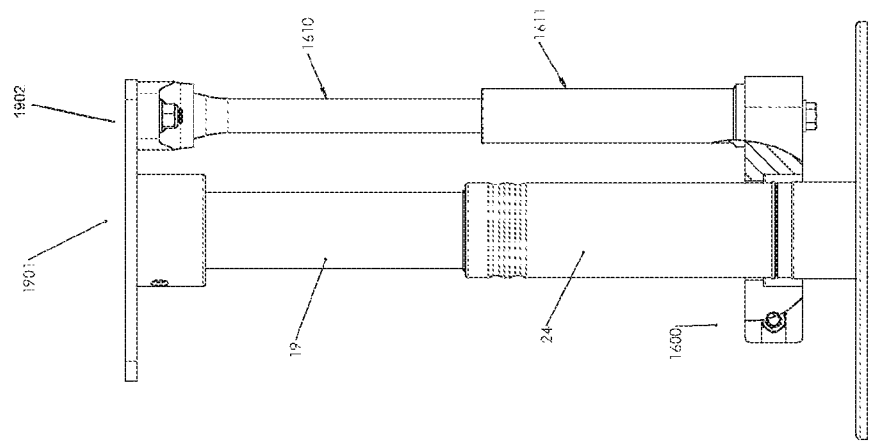
FIG. 16 is a first side elevation view of an alternate embodiment of the present invention.
Figure 19:
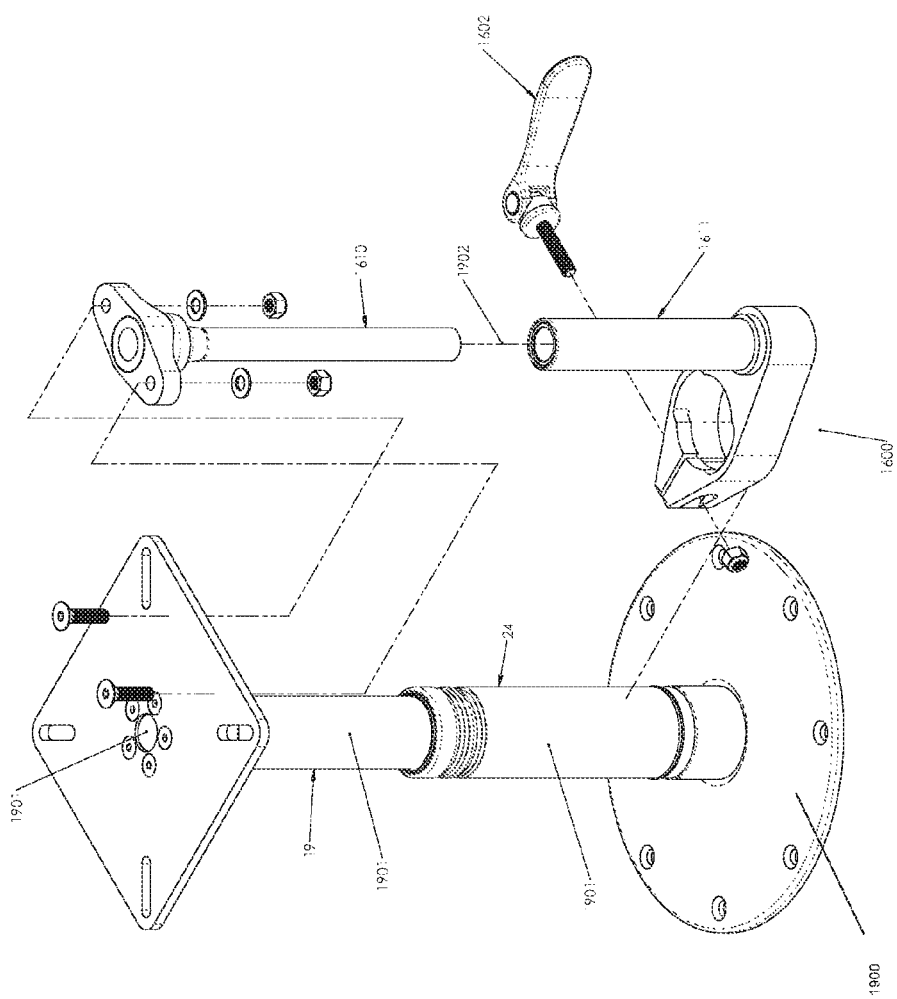
FIG. 19 is an exploded perspective view of the embodiment of FIG. 16.
Figure 22:
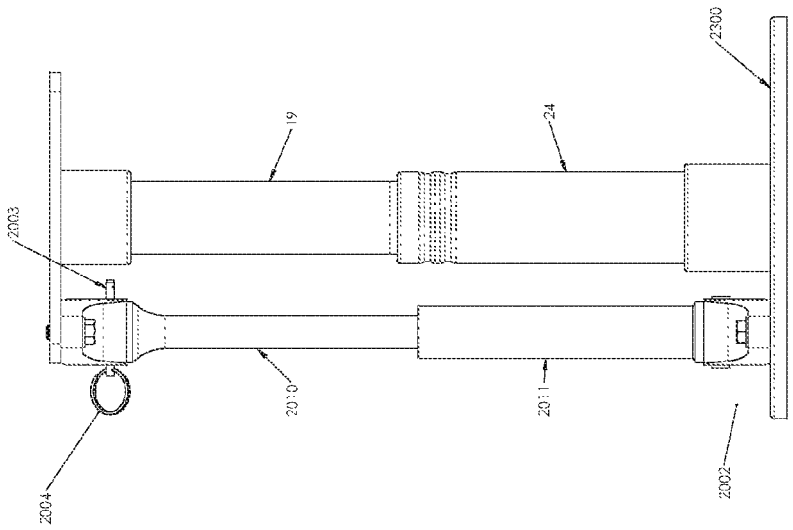
FIG. 22 is a second side elevation view of the embodiment of FIG. 20.
Figure 21:
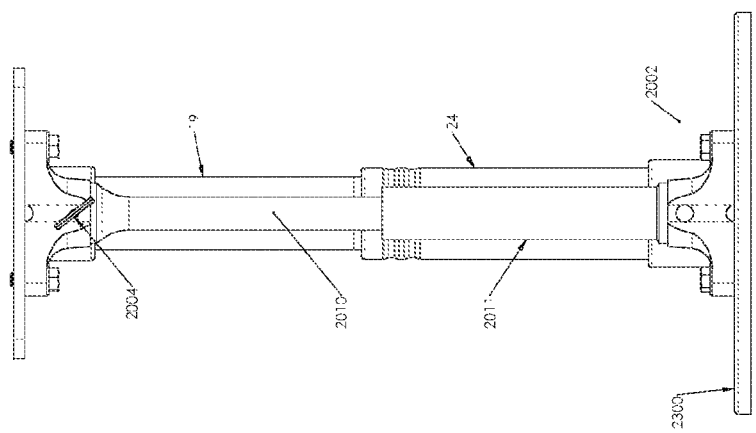
FIG. 21 is a backside elevation view of the embodiment of FIG. 20.
Figure 20:
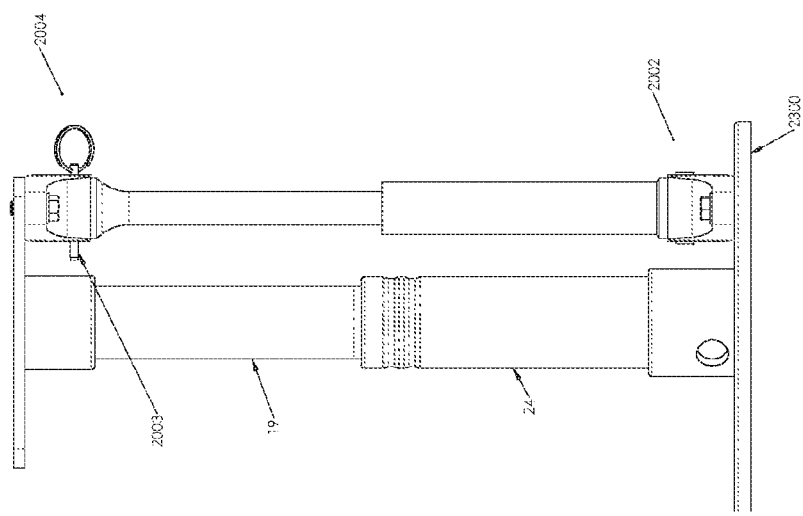
FIG. 20 is a first side elevation view of an alternate embodiment of the present invention.
Figure 23:
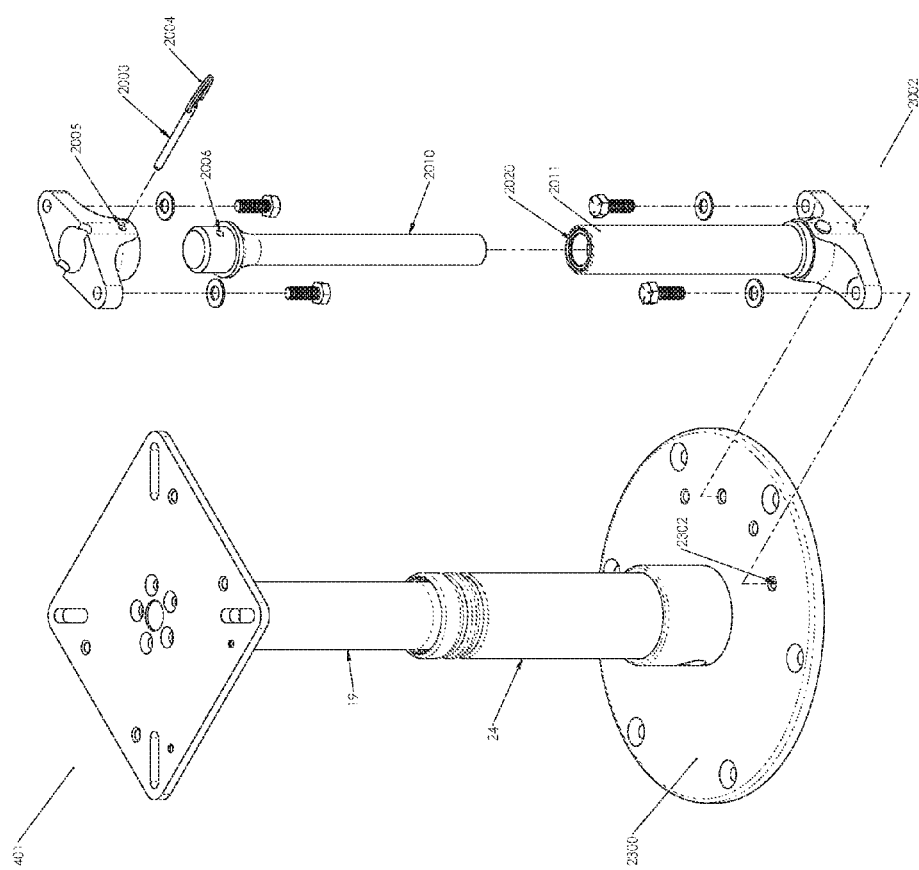
FIG. 23 is an exploded perspective view of the embodiment of FIG. 20.

Now referring to FIGS. 12-15, there is shown a selectively lockable swivel shock absorbing boat seat pedestal of the present invention comprising a lock base member 1200, which is coupled to a lock pin receiver 4111, which receives the lock pin assembly 4101, which is coupled to the boat seat mating plate 401. FIG. 12 shows a side view of where the right side of the drawing would likely be below the back side of the boat seat bottom, not shown. The left side of FIG. 12 would be nearer the front of the boat seat bottom. FIG. 13 shows the same structure where the boat seat mating plate 401 has been rotated 90 degrees from FIG. 12. FIG. 14 shows the same structure rotated another 90 degrees. This embodiment differs in several ways from the embodiment of FIGS. 4-9, including that the clamping to the tube 24 is down toward the bottom and not toward the top. It should be noted that the tube top free end surface 4112, located near the top of tube 24, does not have any structure which is configured to restrict rotation of the tube 19 within tube 24. Similarly, tube top surface features exposed surfaces 4113, which are fully exposed and perform no function of restricting such rotation. It should be understood that it may be preferred to eliminate tube top surface features exposed surfaces 4113 from some embodiments, as they are not needed in some embodiments. Rotation of the lock rotary head tension adjuster 1202 pulls together two portions of the lock base member 1200 and increases the friction between lock base member 1200 and tube 24. When boat seat mating plate 401 rotates by the pilot turning the pilot's seat, the lock base member 1200, (which is coupled via lock pin assembly 4101) will rotate around the tube 24. When the lock rotary head tension adjuster 1202 is tightened sufficiently, the lock base member 1200 is clamped to the tube 24 and the pilot seat will not rotate and is effectively rotationally locked, while still permitting vertical motion of the shock absorber (tube 19 into tube 24 and via lock pin assembly 4101 into lock pin receiver 4111).

Now referring to FIGS. 16-19, there is shown an alternate embodiment of the present invention where lower pivot lock assembly 1600 is coupled to a lower end of tube 24. There is clearance between a bottom portion of lower pivot lock assembly 1600 and a top side of floor plate mount 1900. A functional difference between the embodiment of FIGS. 12-15 and FIGS. 16-19 is that the clamping force applied on the tube 24 by the lower pivot lock assembly 1600 is not provided by turning a rotary knob but by pivoting a lower pivot lock handle 1602. Lock pin assembly 1610 and lock pin receiver 1611 are similar to lock pin assembly 4101 and lock pin receiver 4111 of FIG. 15. The line marked 1901 is the first tube central longitudinal axis and the second tube central longitudinal axis and is also the shock central longitudinal axis 1901. Line 1902 is parallel to line 1901 and is the lock pin central longitudinal axis and the lock pin receiver central longitudinal axis.

Now referring to FIGS. 20-23, there is shown an alternate embodiment of the present invention which has no clamping force applied to the tube 24 to restrict rotations of tube 19. There is shown a lock pin 2010 and a lock pin receiver 2011, which allows for telescopic movement as similar structure in the other above discussed embodiments. However, the bottom portion of lock pin 2010 and the lock pin receiver 2011 do not rotate around tube 24 as do the lock pin and the lock pin receivers in other embodiments. Instead, the lower end of lock pin receiver 2011 is bolted to floor plate mount 2300 through mounting holes 2302. There is shown a lock pin 2010 top receiving mount with a lock pin release pin outer receiving orifice 2005 therein. This mount is bolted to the boat seat mating plate 401. Lock pin release pin inner receiving orifice 2006 is shown disposed in the top end of lock pin 2010, and when lock pin release pin 2003 is inserted through both lock pin release pin outer receiving orifice 2005 and then through lock pin release pin inner receiving orifice 2006, the seat is rotationally locked while still permitting vertical motion for shock absorption. When the pilot wishes to rotate the pilot's seat, a quick removal of the lock pin release pin 2003, by pulling on the lock pin release pin ring 2004 in a single direction, results in the lock pin 2010 falling down into the lock pin receiver 2011. In this configuration, the boat seat mating plate 401 is coupled to the floor plate mount 2300 only through the tubes 19 and 24 (which permit relative rotary movement therebetween). The mount with the lock pin release pin outer receiving orifice 2005 therein remains bolted to the boat seat mating plate 401 and rotates around the central axis of the tube 24 when the pilot's seat is rotated. To relock the seat, the mount with lock pin release pin outer receiving orifice 2005 therein must be located directly above the top of lock pin 2010 and it is pulled up and moved into so that lock pin release pin 2003 can be inserted through both lock pin release pin outer receiving orifice 2005 and lock pin release pin inner receiving orifice 2006, effectively locking rotation of the seat.

Although the invention has been described in detail in the foregoing only for the purpose of illustration, it is to be understood that such detail is solely for that purpose and that variations can be made therein by those of ordinary skill in the art without departing from the spirit and scope of the invention as defined by the following claims, including all equivalents thereof.

For example, in the embodiment of FIGS. 4-11, the locking lever assembly 440 could be replaced with a bolt with a stationary head and a nut on the opposing end. The nut could be tightened further to achieve the same result as locking the lever of locking lever assembly 440. In such an arrangement, the stationary bolt and nut could be an effective means for selectively engaging a structure to an outer tube, without interfering with translation of tube through the outer tube. This nut could also have graduated markings thereon to show how far to turn the nut. The nut could be coupled to a cap or handle to assist in wrench free manipulations.

Similarly, the lock pin receiving void 423 could be a slot instead of a hole (i.e. bearing head-lock pin engaging portion closed end portion 424 is omitted) and the lateral portions of bearing head-lock pin engaging portion 422, which would contact the sides of the lock pin assembly 410 could be configured to be able to be pivoted up or down so as to allow the lock pin assembly 410 to escape from the slot and thereby allow the lock pin assembly 410 to be selectively engaged with tube 24. In such a configuration, if the portion of bearing head-lock pin engaging portion 422, which is pivoting out of engagement with lock pin assembly 410, is permanently attached to the tube 24, there would be no need for the remainder of bearing head assembly 420, brake shoe 430, locking lever assembly 440, etc. The locking could be accomplished by merely pivotally deploying a stop or latch on either side of lock pin assembly 410 so as to prevent rotation in either direction. The latches or stops could pivot, slide from the tube 24 or be detachably coupled to the tube 24. These arrangements and others could be effective means for selectively stopping the rotation of a lock member around a support tube.

It is thought that the method and apparatus of the present invention will be understood from the foregoing description, and that it will be apparent that various changes may be made in the form, construct steps, and arrangement of the parts and steps thereof, without departing from the spirit and scope of the invention, or sacrificing all of their material advantages. The form herein described is merely a preferred exemplary embodiment thereof.

What is claimed is:

1. A selectively lockable swivel seating system for supporting a person in an elevated position above a lower portion of a boat, comprising:
    a seat having a bottom portion;
    a seat base portion associated with said bottom portion of said seat;
    a base member portion configured to couple with a portion of a structure for transporting a person, which is generally lower than a seat height;
    a non-fixed length pedestal disposed between said seat base portion and said base member portion, said non-fixed length pedestal comprising:
        a first tube;
        a second tube; said second tube is at least partially nested within said first tube; said second tube being sized and configured to permit rotation of said second tube with respect to said first tube;
        an air chamber disposed within one of said first tube and said second tube;
        a liquid chamber disposed within another of said first tube and said second tube; said liquid chamber being variably disposed within said one of said first tube and said second tube;
        a piston disposed within said liquid chamber and coupled to a portion of said one of said first tube and said second tube;
        means for introducing pressurized air into said air chamber where an increase in air pressure in said air chamber results in an adjustment of support provided for said seat;
        means for adjustably restricting a liquid flow rate from one side of said piston to another side of said piston and thereby adjustably limiting a rebound rate of said piston after a temporary force applied to said non-fixed length pedestal is reduced; and
    a selective swivel locking mechanism which comprises:
        a pin;
        a pin receiver configured to receive therein the pin at variable depths; and
        wherein said seat base portion comprises a planar seat mating plate configured to couple with one of a seat and a seat intermediate load bearing component and said base member portion comprises a plate configured to mate, at least indirectly, with a floor and where said planar seat mating plate and said plate are substantial parallel and said first tube and said second tube are substantially orthogonal said plate.

2. A selectively lockable swivel seating system for supporting a person in an elevated position above a lower portion of a boat, comprising:
    a seat having a bottom portion;

a seat base portion associated with said bottom portion of said seat;

a base member portion configured to couple with a portion of a structure for transporting a person, which is generally lower than a seat height;

a non-fixed length pedestal disposed between said seat base portion and said base member portion, said non-fixed length pedestal comprising:
a first tube;
a second tube; said second tube is at least partially nested within said first tube; said second tube being sized and configured to permit rotation of said second tube with respect to said first tube;
an air chamber disposed within one of said first tube and said second tube;
a liquid chamber disposed within another of said first tube and said second tube; said liquid chamber being variably disposed within said one of said first tube and said second tube;
a piston disposed within said liquid chamber and coupled to a portion of said one of said first tube and said second tube;
means for introducing pressurized air into said air chamber where an increase in air pressure in said air chamber results in an adjustment of support provided for said seat;
means for adjustably restricting a liquid flow rate from one side of said piston to another side of said piston and thereby adjustably limiting a rebound rate of said piston after a temporary force applied to said non-fixed length pedestal is reduced; and
a selective swivel locking mechanism which comprises:
a pin; and
a pin receiver configured to receive therein the pin at variable depths.

3. The selectively lockable swivel seating system of claim 2 wherein:
said non-fixed length pedestal is an adjustable length pedestal, said liquid chamber is an oil chamber, said first tube and said second tube each have a circular cross-section to allow rotation therebetween, and said air chamber is wholly disposed in said one of said first tube and said second tube.

4. The selectively lockable swivel seating system of claim 2 wherein said pin is detachable, by a single linear motion, from said seat mating plate and said pin receiver is coupled to said plate.

5. The selectively lockable swivel seating system of claim 2 wherein said pin is coupled to said seat mating plate and said lock pin receiver is configured to be rotatable around a common longitudinal axis of said first tube and said second tube.

6. A system for supporting a seated person comprising:
a support structure, configured to support a seated person;
a mount configured to be fixed to supporting member;
a first tube, having a first tube central longitudinal axis;
a second tube, having a second tube central longitudinal axis which is co-linear with respect to said first tube central longitudinal axis;
said first tube and said second tube being arranged with respect to each other in a nested arrangement where relative translational movement therebetween is possible along said first tube central longitudinal axis and said second tube central longitudinal axis; and said nested arrangement extending along said first tube central longitudinal axis between said support structure and said mount;
said first tube and said second tube forming a portion of a shock having a shock central longitudinal axis which is co-linear with said first tube central longitudinal axis;
one of said first tube and said second tube being configured to allow rotation around said shock central longitudinal axis; and
a rotational lock system comprising:
a locking member having a locking member central longitudinal axis;
a locking member receiver having a locking member receiver central longitudinal axis which is co-linear with respect to said locking member central longitudinal axis;
a release member configured to release one of said locking member and said locking member receiver from a coupled relationship with respect to said support structure when said releasing member is removed from a releasing member receiving orifice; and
said locking member and said locking member receiver being configured to prohibit rotation of said support structure about said shock central longitudinal axis when said releasing member is disposed in said releasing member receiving orifice.

7. The system of claim 6 wherein:
said first tube has a circular cross section;
said support structure, is a seat;
said mount is a metal disk;
said first tube is disposed adjacent said second tube;
said shock is free of any springs and is an oil damped air shock; and
said locking member has said releasing member receiving orifice therein.

8. The system of claim 6 wherein said first tube and said second tube are configured to allow more than 570 degrees of continuous rotation around said shock central longitudinal axis.

9. A system for supporting a body comprising:
a structure, configured to support a body;
a mount configured to be fixed to a substrate;
a first member, having a first member central longitudinal axis;
a second member, having a second member central longitudinal axis which is co-linear with respect to said first member central longitudinal axis;
said first member and said second member being arranged with respect to each other in an arrangement where relative translational movement therebetween is possible along said first member central longitudinal axis and said second member central longitudinal axis; and
said arrangement extending along said first member central longitudinal axis between said structure and said mount;
said first member and said second member forming a portion of a shock having a shock central longitudinal axis which is co-linear with said first member central longitudinal axis;
one of said first member and said second member being configured to allow movement around said shock central longitudinal axis; and
a lock system comprising:
a lock member having a lock member central longitudinal axis;

a lock member receiver having a lock member receiver central longitudinal axis which is co-linear with respect to said lock member central longitudinal axis; and a release configured to release at least one of said lock member and said lock member receiver from a coupled relationship with respect to said structure.

10. The system of claim 9 wherein said release comprises a release member which is removed from a release member receiving orifice; and said lock member and said lock member receiver being configured to prohibit rotation of said structure about said shock central longitudinal axis when said release member is disposed in said release member receiving orifice.

11. The system of claim 9 where said shock is free of any springs.

12. The system of claim 11 wherein said shock is an air shock.

13. The system of claim 12 wherein said air shock is an oil damped air shock.

14. The system of claim 9 wherein:
said structure comprises a boat seat;
said body is a person;
said substrate comprises a boat floor;

said first member comprises a circular cylinder;
said second member comprises a circular cylinder;
said lock member being releasably coupled to said structure; and
said a lock member receiver comprises a circular cylinder.

15. The system of claim 9 wherein said release is free of any clamping structure around said first member and free of any clamping structure around said second member.

16. The system of claim 9 wherein said release comprise an adjustable clamping structure.

17. The system of claim 9 wherein said first member has a first member diameter smaller than a second member diameter of said second member and said first member is proximal to said structure.

18. The system of claim 17 wherein said release comprises an adjustable clamping structure disposed at an end of said second member which is proximal to said structure.

19. The system of claim 17 wherein said release comprises an adjustable clamping structure disposed at an end of said second member which is distal of said support structure.

20. The system of claim 18 wherein said adjustable clamping structure is in registration with annular surface features on said second member.

* * * * *